Jan. 14, 1958  H. JOSEPH  2,819,487
SHRIMP SHELLER AND DEVEINER
Filed Nov. 19, 1956
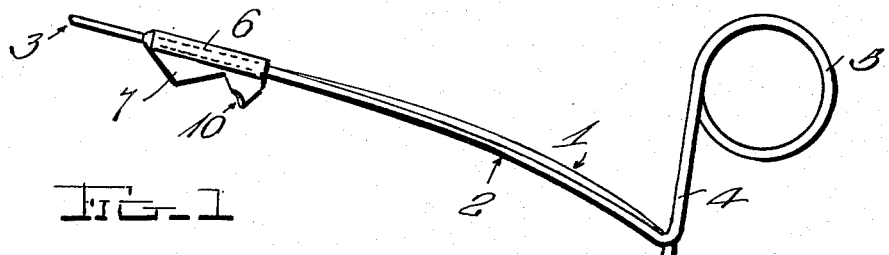
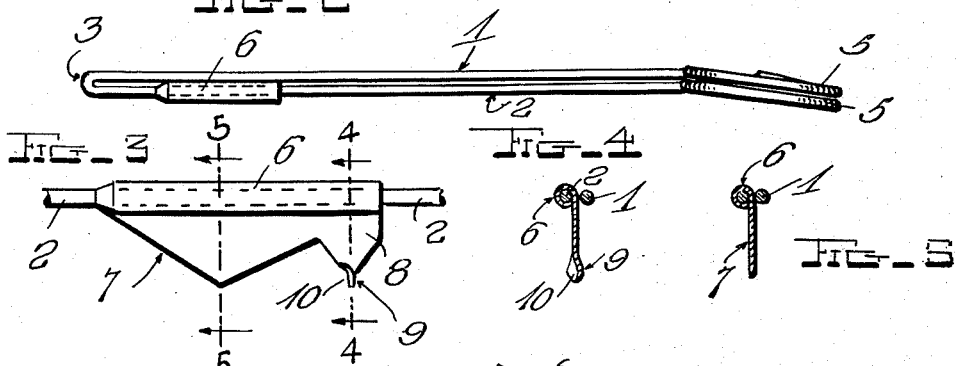
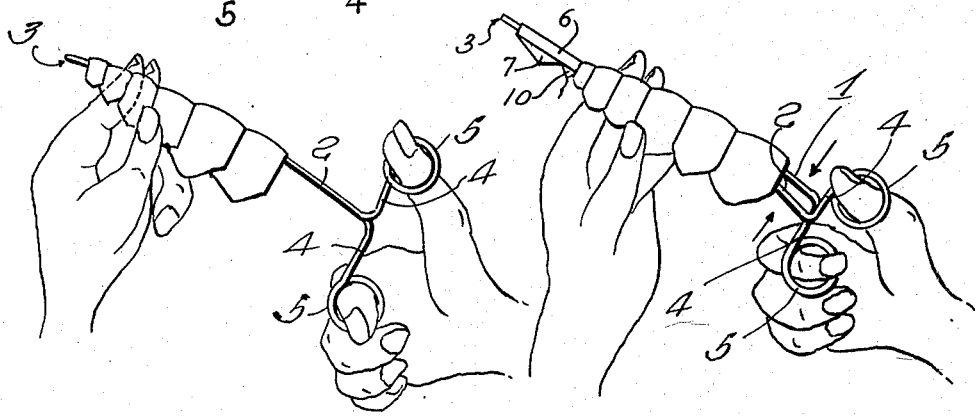
INVENTOR,
Henry Joseph,
BY E. E. Vrooman & Co.,
ATTORNEYS

United States Patent Office 2,819,487
Patented Jan. 14, 1958

2,819,487

SHRIMP SHELLER AND DEVEINER

Henry Joseph, New Orleans, La., assignor by mesne assignments, to Henry Joseph, New Orleans, La.

Application November 19, 1956, Serial No. 622,846

6 Claims. (Cl. 17—7)

This invention relates to a shrimp sheller and deveiner.

An object of the invention is to provide a shrimp sheller and deveiner that will remove the shell and simultaneously remove the vein in one operation.

Another object of the invention is to provide a simple and efficient sheller and deveiner for doing an excellent cleaning job in a comparatively simple operation.

A further object of the invention is to provide a novel instrument having means for deveining a shrimp.

A still further object of the invention is to provide an efficient shrimp sheller and deveiner that is positive in action, durable in construction, and comparatively inexpensive to manufacture.

Still another object of the invention is to provide a novel shrimp sheller and deveiner for quickly removing the shell and deveining the shrimp at one and the same time.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a perspective view of a shrimp sheller and deveiner constructed in accordance with this invention, while Figure 2 is a top plan view of the same.

Figure 3 is a fragmentary enlarged view of the shrimp sheller and deveiner.

Figure 4 is a vertical sectional view taken on line 4—4, Figure 3, and looking in the direction of the arrows.

Figure 5 is a vertical sectional view taken on line 5—5 Figure 3, and looking in the direction of the arrows.

Figure 6 is a perspective view showing the device inserted in the shrimp, while

Figure 7 is a perspective view showing the device in position for lifting off the shell and taking out the vein, leaving the shrimp clean of the shell and vein.

Referring to the drawings by numerals, the shrimp sheller and deveiner comprises a primary arm 1 and an auxiliary arm 2, which are formed from a single piece of comparatively stiff wire, and are integral at their outer end 3, Fig. 2. Each arm is provided at its inner end with a substantially right-angled extension 4, on the outer end of which is a double-looped eye 5. These eyes 5 are for receiving the thumb and forefinger of the operator (Figs. 6 and 7) when the device is being used.

On the auxiliary arm 2 is an elongated sleeve 6 that is provided with an integral depending cutting blade 7. This cutting blade is preferably V-shape and has its outer edge sharpened, for an efficient action. At the rear or auxiliary portion 8 of the cutting blade 7 is a laterally turned portion or hoe 9, which is dished at 10, for efficiently removing the vein, during the operation of the device, for producing an excellent cleaning job of the shrimp.

It is to be understood that the cutting blade 7 is employed for splitting the shrimp and opening the same while the hoe 9 removes the vein.

The present device is employed by inserting the arms 1 and 2 in their closed position immediately beneath the shell of a shrimp, and sliding the arms longitudinally along the back of the shrimp so that the blade 7 splits the shrimp meat from the shell down to the vein, and the hoe 9 catches the sand vein and tears it out as the shrimp cleaner moves along the shrimp body.

The blade and vein removing hoe cooperate to permit the vein to be carried longitudinally and out the tail of the shrimp as the forward end of the shrimp cleaner completes its passage through the body of the shrimp.

As seen in Figs. 6 and 7, operator may bring his thumb and forefinger together to separate the two arms of the shrimp cleaner rearwardly from their joined forward end 3 to produce a lifting action which forces the shell upwardly off the shrimp, so that the body of the shrimp is pushed out through the lower portion of the shell. With a small shrimp, the lifting operation need be performed only once; but in the case of a large shrimp it may be necessary to deshell in two stages. The operator's thumb and forefinger are brought together once when the shrimp cleaner is in approximately the position of Fig. 6 to loosen the shrimp from the shell, and the operator's thumb and forefinger may again be brought together when the cleaner is in position of Fig. 7 to complete the separation of the shell from the body of the shrimp.

The cutting blade 7 splits open the body of the shrimp down to the vein, allowing the hoe 9 to drag the vein along as the device is pushed through under the shell.

As hereinbefore stated, the bringing of the fingers together causes a lift that throws off the shell and completes the operation by a slight push, leaving the shrimp open, and clean of the vein.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. A shrimp cleaner, comprising: a resilient wire member having a reverse bend to form a pair of normally parallel arms, the ends of the arms being outwardly extending at substantially right angles and terminating in a finger-engaging loop, and an outwardly directed cutting blade carried by one of said arms adjacent its juncture with the other of said arms.

2. A shrimp cleaner, comprising: a resilient wire member having a reverse bend to form a pair of normally parallel arms, the ends of the arms being outwardly extending at substantially right angles and terminating in a finger-engaging loop, an outwardly directed cutting blade carried by one of said arms adjacent its juncture with the other of said arms, and said cutting blade including an integral sleeve mounted on one of said arms and lying in substantially the same plane as said finger-engaging loop.

3. The structure of claim 2 wherein said blade is provided with a V-shaped cutting edge and a notched portion, said notched portion being indented to form a vein removing hoe.

4. A shrimp cleaner comprising: a resilient wire member having a reverse bend to form a pair of normally parallel arms, the ends of the arms being outwardly extending and terminating in spaced finger pieces; and an outwardly directed cutting blade carried by one of the said arms adjacent its juncture with the other of said arms.

5. The device of claim 4 in which the rear part of the blade has a laterally turned portion forming a vein removing hoe.

6. The device of claim 4 in which the blade has an inclined cutting edge, a notch behind said edge, and a laterally turned portion on the rear margin of the notch forming a vein removing hoe.

References Cited in the file of this patent

UNITED STATES PATENTS

| | | |
|---|---|---|
| 2,039,678 | Brown | May 5, 1936 |
| 2,552,450 | Paoli | May 8, 1951 |
| 2,561,359 | Gorton | July 24, 1951 |
| 2,647,278 | Weinberger | Aug. 4, 1953 |
| 2,648,094 | Paoli | Aug. 11, 1953 |
| 2,729,254 | McLaughlin | Jan. 3, 1956 |